Nov. 24, 1931.  C. O. HARRINGTON  1,833,160
MULTIPLE LENS SIGNAL LANTERN
Filed Dec. 11, 1922
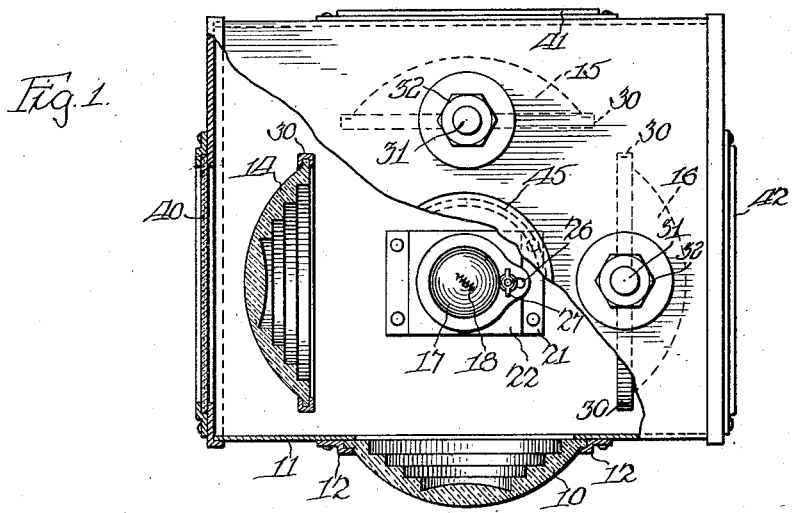
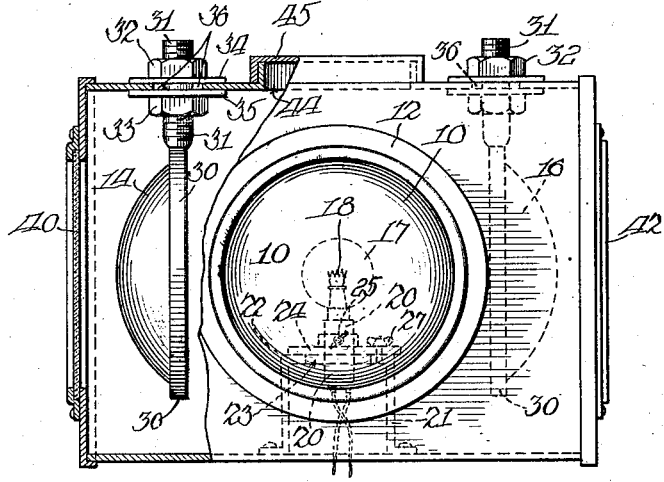
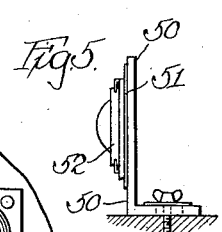
Inventor:
Clinton O. Harrington
By Luther Johns  Atty.

Patented Nov. 24, 1931

1,833,160

UNITED STATES PATENT OFFICE

CLINTON O. HARRINGTON, OF CHICAGO, ILLINOIS, ASSIGNOR TO ALDOBILT COMPANY, OF CHICAGO, ILLINOIS, A CORPORATION OF ILLINOIS

MULTIPLE LENS SIGNAL LANTERN

Application filed December 11, 1922. Serial No. 606,025.

In railway practice it is customary to provide a signal lantern having a plurality of light-projecting lenses illuminated from a common source. In some instances there are as many as four lenses ninety degrees apart with a common source of light at the central area. Such lanterns are frequently employed at switches and are so connected with the switch-shifting mechanism that moving the switch turns the lantern and presents a lens of a different color when viewed from a given direction. In other instances lanterns are employed having two lenses at right angles to each other with a common source of light, the rays which pass through one of the lenses being reflected forward in the general direction of those of the other lens, swinging arms being adapted to be moved into the path or paths of projected light to cut off or change the nature of the signal emanating from the lenses respectively.

It has been suggested in railway practice to use what are known as concentrated filament electric lamps as the source of light. In the older practice, in which the source of light was relatively large, the substantially exact positioning of the source at the foci of the lenses variously disposed, as at right angles to each other, was not essential to fairly good results; but with these concentrated filament lamps it is substantially vital to the proper illumination of the lenses that the source of light be at or substantially at their respective foci.

The lenses which are provided for such signal work are of standard construction, made in large quantities of pressed glass, and are not ground or otherwise surfaced. Their respective focal distances vary a great deal. According to ordinary machine shop practice, too, the seats for the lenses respectively are only approximately uniform and vary in all measurements. Furthermore, the incandizable filament is not always at the same relative position in the lamp with respect to the lamp's base or plug member. For these principal reasons the use of the concentrated filament lamp in such multiple-lens lanterns did not, prior to my present invention, meet with success, although various efforts have been made to overcome the difficulties pointed out.

In lanterns wherein there is only one lens to be illuminated from the source the effect of the various disparities in lenses, seats for same, and filament location is overcome in usual practice through lamp-holding means providing for adjustment of the lamp in vertical, lateral and fore-and-aft directions.

The principal object of the present improvements is to provide a simple and advantageous method and means for utilizing in a highly-efficient way a concentrated filament lamp in a lantern having a plurality of projection lenses, the optical axes of which are materially divergent and which, according to present practice, are substantially at right angles to each other. The invention provides that each of such lenses and the common small source of light may easily and readily be placed in focal relation and the desired good signal effects thereby obtained. A specific object is to provide a signal lantern having lenses variously directed and which has such features of lens adjustment that an individual lens or a plurality of such lenses may be accurately focused with respect to the common relatively small source of light.

Other objects and advantages will appear hereinafter.

In the accompanying drawings, which form a part of this specification, Figure 1 is a top plan of a lantern body having four projecting lenses ninety degrees apart, the top wall being partially broken away and two of the lenses and associated parts being shown in medial horizontal section; Fig. 2 is a side elevation of the lantern of Fig. 1, certain walls being partially broken away; Fig. 3 is a fragmentary medial horizontal section of a modified form of the device; Fig. 4 is a fragmentary view showing in top view the lamp-adjusting means illustrated by dotted lines in Fig. 2; and Fig. 5 is a small side elevation of another form of means for adjusting a lens in vertical, lateral and fore-and-aft directions.

Referring to Figs. 1 and 2 the lantern body is shown as a rectangular casing which may be of any approved construction, and of any other approved form. A projecting lens 10, of ordinary construction, is secured upon the side wall 11 of the housing by means of a clamping ring 12. Three other lenses 14, 15 and 16, of the same construction, are so arranged that the optical axes of the adjacent ones of the four lenses are ninety degrees apart. At the middle portion of the lantern is the lamp 17 having the concentrated filament 18, the lamp being mounted in a cylindrical base member 20. The lamp supporting bracket 21 has a horizontal plate-like top 22 which has a relatively large central opening at 23. The lamp base 20 extends through this opening 23 and also through an opening in a plate-like support 24 resting on the platform 22. By means of the set screw 25 the lamp base 20 may be held in any desired position of vertical adjustment. The plate 24 has a slot-like opening 26, and a binding screw 27 threaded into the bracket member 21—22 holds the plate 24 in any desired position of fore-and-aft adjustment; and since the plate 24 may swing laterally on the screw 27 as a pivot this binding screw 27 holds the lamp in any desired position of lateral adjustment also.

I have illustrated and described this simple form of lamp-adjusting device merely as a convenient way for showing that the concentrated filament 18 in Figs. 1 and 2 may readily be adjusted in vertical, lateral and fore-and-aft directions. Various devices have been suggested for so adjusting lamps, and for an illustration and description of a highly efficient device for the purpose reference may be had to my copending application, Serial No. 454,444 filed March 22, 1921, entitled Method of maintaining a source of light in a desired position in a lantern.

Each of the lenses 14, 15 and 16 is mounted for adjustment in vertical, lateral and fore-and-aft directions, and since the adjusting means for each lens are the same, one description and common reference characters will suffice. Each of these adjustable lenses is held by a metallic band 30 terminating in a radially-directed threaded member 31 upon which is a pair of binding nuts 32 and 33 and a pair of washers 34 and 35, the screw 31 projecting through a relatively large hole 36 in the top wall of the lantern body providing for considerable movement of the screw member therein, the binding nuts being arranged to clamp upon opposite surfaces of the body wall. According to this construction it is evident that each of the lenses 14, 15 and 16 may be adjusted vertically, and from side to side and also in fore-and-aft directions.

In the path of light from each of the lenses 14, 15 and 16 are glass plates 40, 41 and 42 respectively held by clamping rings and overlying light openings in the body walls. Such glass plates not only close the respective light openings in the lantern body but since they may be of colored glass the lenses 14, 15 and 16 may be of white glass and the desired signals obtained and modified from time to time in a simple, cheap and expeditious way.

In focusing all of the lenses in such a device as Figs. 1 and 2 having one relatively fixed lens as 10, the adjustment is first made with respect to the relatively fixed lens, and this is accomplished through the lamp-adjusting means including the parts shown in Fig. 4. Having made the adjustments of the lamp to provide its filament at the focus of the fixed lens 10, each of the adjustable lenses 14, 15 and 16 is adjusted in turn to bring its focus at the filament 18, and thus the desired focusing of all of the lenses is accomplished.

In order that the operator may have convenient access to the lamp-adjusting means as well as to the lens-adjusting means within the lantern body a hand hole 44 is provided in the top of the lantern body and the removable cover 45 maintains the interior secure against the weather.

Turning now to Fig. 3 it may be considered that the lantern body there fragmentarily shown is in general respects like that shown in Figs. 1 and 2 and that the only material departure therefrom is in the provision of a relatively fixed lamp support 47 and in the fact that all of the lenses are adjustable. Assuming that the small filament 48 is not adjustable in the device of Fig. 3 and that the lenses as 49 and 50 are adjustable in vertical, lateral and fore-and-aft directions, the operator simply adjusts each of the lenses, one at a time, to the fixed source of light. According to such construction the lamp adjustment feature is entirely dispensed with, simplifying and cheapening the construction.

For adjusting the lenses in the desired directions it is apparent that various means could readily be suggested other than the one shown in Figs. 2 and 4, for instance as shown in Fig. 5, in which the L-shaped bracket 50 is mounted for fore-and-aft adjustments, the support 51 being mounted for vertical adjustments on the support 50, as by sliding up and down in guide members at the lateral edges thereof, and the lens support 52 being mounted for lateral adjustments on the support 51, as by sliding horizontally in similar guide members and as illustrated.

I contemplate as being within the present invention such modifications, changes and departures from what is specifically herein illustrated and described as are included in the scope of the appended claims.

I claim:

1. In a signal lantern, the combination of a lantern body, a plurality of projection lenses carried thereby and positioned so as to project light in various directions, one of said lenses being within the lantern body, a projection opening in the lantern body opposite said one of said lenses, a substantially transparent plate covering said opening, a small and concentrated source of light common to said lenses, and means for effecting a focused relation between said lenses respectively and said source, said means including means associated with said one of said lenses for adjusting it in vertical, lateral and fore-and-aft directions.

2. In a signal lantern, the combination of a lantern body, means providing a concentrated source of light therein, and a plurality of lenses associated with said body and arranged to project light from said source in various directions, means for adjusting said source in vertical, lateral and fore-and-aft directions to bring it substantially at the focus of one of said lenses, another of said lenses being mounted for adjustment in vertical, lateral and fore-and-aft directions to focus it with respect to the source of light.

3. In a signal lantern, the combination of a lantern body, a plurality of projection lenses carried thereby and positioned so as to project light in various directions, a common source of concentrated light for said lenses, means for adjusting said source to the focus of one of said lenses, and means associated with the other ones of said lenses respectively for adjusting each thereof individually in vertical, lateral and fore-and-aft directions, for the purpose specified.

CLINTON O. HARRINGTON.